Feb. 9, 1971 C. K. SITTERLY 3,561,176
BAY WINDOW STRUCTURE
Filed Oct. 22, 1968 2 Sheets-Sheet 1

INVENTOR.
CHARLES K. SITTERLY

BY *Hofgren, Wegner, Allen,*
*Stellman & McCord*

ATTORNEYS.

Feb. 9, 1971 C. K. SITTERLY 3,561,176
BAY WINDOW STRUCTURE
Filed Oct. 22, 1968
2 Sheets-Sheet 2
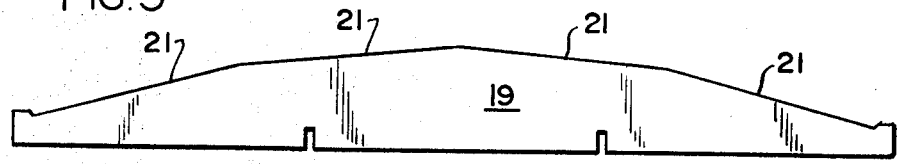
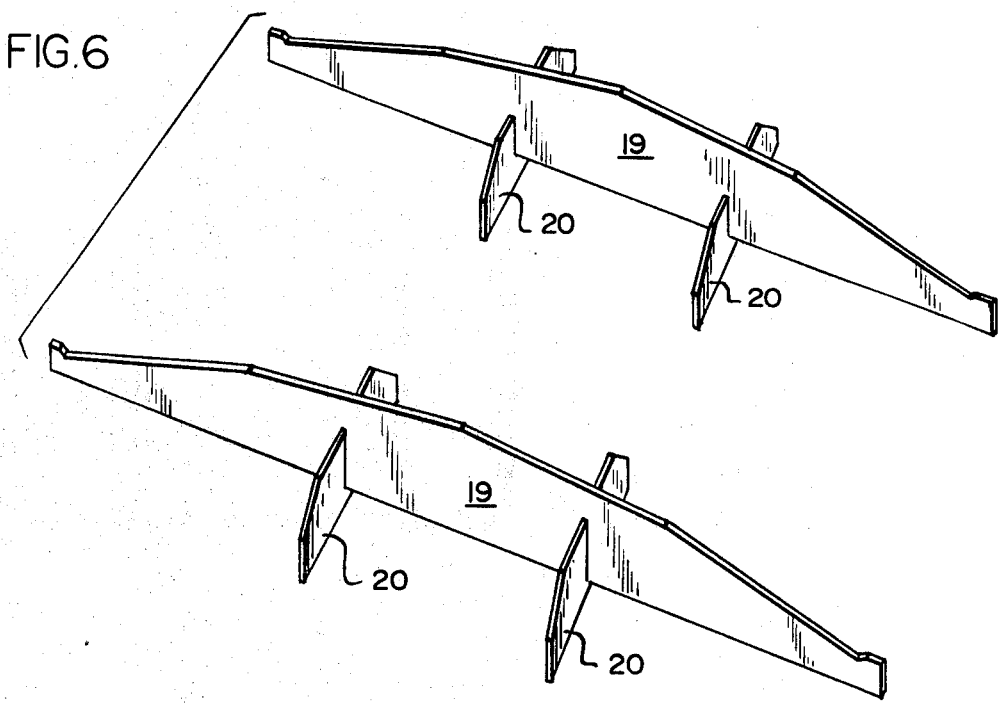
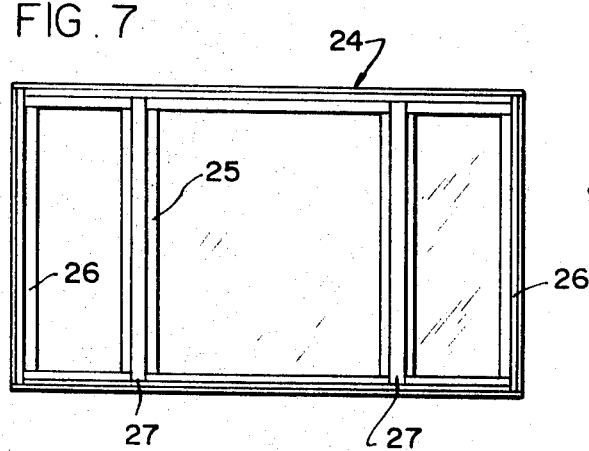
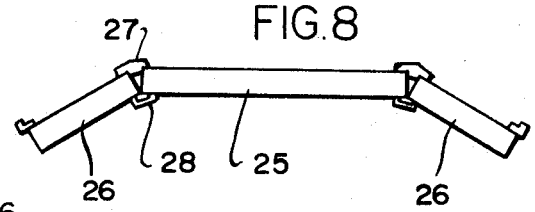

United States Patent Office 3,561,176
Patented Feb. 9, 1971

3,561,176
BAY WINDOW STRUCTURE
Charles K. Sitterly, Dubuque, Iowa, assignor to Caradco Incorporated, a corporation of Iowa
Filed Oct. 22, 1968, Ser. No. 769,601
Int. Cl. E04b 1/38
U.S. Cl. 52—201                                     5 Claims

ABSTRACT OF THE DISCLOSURE

A bay window structure that may be either a bow bay, an angle bay or any other common bay structure comprising a plurality of window frames, each of which may be but is not necessarily a standard casement window unit, arranged side-by-side with adjacent edges on the inner side of the assembly of frames, at least one bendable connecting strip such as of metal, plastic or the like attached to these frame edges and bridging the space therebetween with each strip being bent to the bay contour of the structure, a first cover strip attached to the frames to conceal the bridging connecting strip and a second cover strip interconnecting the frames on the outer side of the bay structure to give a continuous window appearance.

---

Both angle bay windows and bow bay windows which are sometimes referred to as radial bays because it is a peripheral part of a true circle are widely used in construction particularly in homes. Until recent years bay windows and especially bow bays have been quite expensive so that actually the house was in a sense built around the bay grouping of window units.

In order to reduce the cost there have been bay window structures constructed, as an inexpensive unit bow bay, which were installed in the building usually during construction. However, these were not entirely satisfactory and did not perform as designed. Later more perfected bow bay window structures were built using a solid wedge between the jambs to provide an angle or in certain instances a special angled vertical frame mull or post was used. However, this was not an entirely satisfactory solution to the problem as such specially constructed windows were quite costly to build so that the average home builder did not use them because of the expense.

In the bay window structure of this invention, both bow and angle bay, a solid thoroughly satisfactory structure results at low expense because it can use only standard window frames which are essentially rectangular boxes with flat outsides rather than pitched. This alone is a very important feature because the unit frames can be stacked together on all sides and the bow structure functions satisfactorily either with or without outside brick mold or sub-sill.

One of the features of this invention therefore is to provide an improved bay window structure that is easy to construct, inexpensive, highly satisfactory, that can use ordinary window frame units and that can readily accommodate itself to using as many window units as desired to construct the bay.

Another feature of the invention is to provide an improved method of making such a bay window structure.

The invention will be described as disclosed in the embodiments thereof shown in the accompanying drawings. Of the drawings:

FIG. 5 is a front elevational view of an angled jig part for shaping the interconnected frames.

FIG. 6 is a plan view of a pair of such jigs with supporting feet.

FIG. 7 is a view similar to FIG. 1 but showing a second embodiment of the invention which is an angle bay.

FIG. 8 is a plan view of the bay of FIG. 7.

Figure 1:
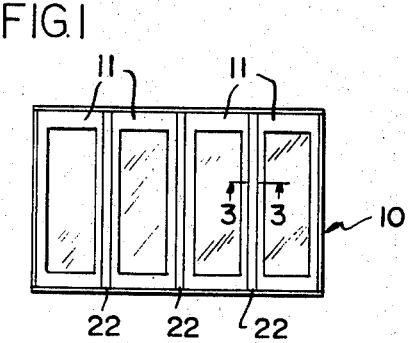
FIG. 1 is a front elevational view of a four window unit bow bay window structure.
Figure 2:
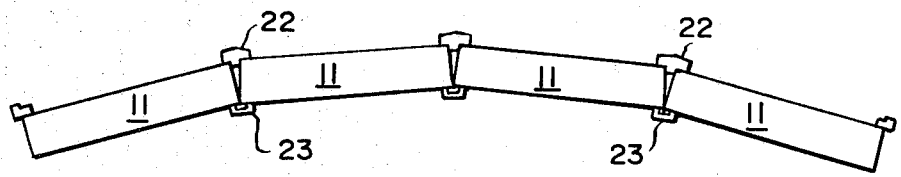
FIG. 2 is a plan view of the structure of FIG. 1.

In the embodiment of FIGS. 1–4 the bay window structure 10 comprises a plurality of window frames 11 interconnected at their inner edges to form a bow bay as shown in FIG. 2. In the embodiment there are of course four units or window frames 11.

Figure 3:
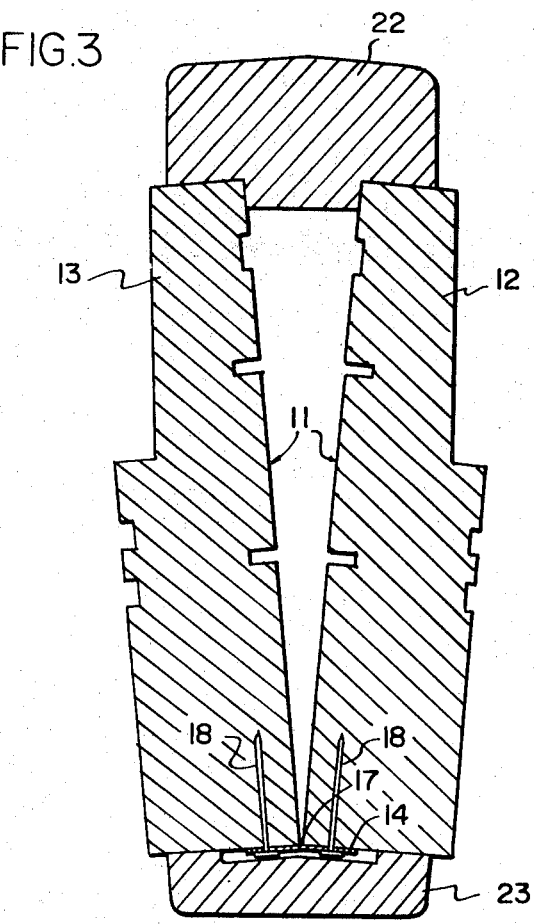
FIG. 3 is an enlarged horizontal sectional view taken substantially along line 3—3 of FIG. 1.
Figure 4:
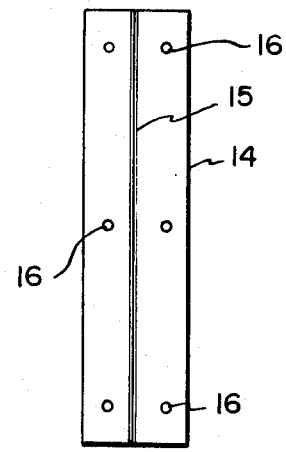
FIG. 4 is a detail plan view of a single bendable connecting strip for attaching adjacent window frames together at the desired angle.

As shown most clearly in the enlarged section of FIG. 3 the side stiles 12 and 13 of adjacent frames 11 are interconnected at their inner edges of the bay structure 10 by a vertical series of bendable connecting strips 14 of which one is shown in FIG. 4.

As is shown there, each strip 14 which may be of metal, plastic or any similar material that is capable of attaching the frames together, bridging the spaces therebetween and of bending to the desired angle may be used. Each strip 14, as shown, contains a central longitudinal crease 15 to aid in bending it and a plurality of nail holes 16 on opposite sides of the crease. In the ordinary window frame construction from three to five of these fasteners which are most conveniently of metal are used to interconnect the adjacent edges of each pair of window frames. In one embodiment each connecting strip was about 3 inches long by 0.75 inch wide.

In constructing the bay the series of window frames 11 is preferably arranged flat and the bendable connecting strips 14 nailed in position across adjacent inner edges 17 of the adjacent frames as by nails 18 which are preferably slightly larger than the nail openings 16. After all the fastening strips 14 are in place to connect the number of window units used, which in this embodiment is four, the assembly is draped over a jig which is illustrated in FIGS. 5 and 6. This jig comprises jig ribs 19 each mounted on a pair of supporting feet 20 and two of these assemblies are customarily employed as shown in FIG. 6. Each jig rib 19 has a flat upper surface section 21 that corresponds to the individual window frame 11. The sections 21 are of course arranged at the angle that is desired for the bay itself as shown in FIG. 2.

When the interconnected window frames are draped over the jig ribs 19 of FIG. 6 the metal connecting strips 14 which may be of steel are bent around the crease 15 serving as a hinge as shown in FIG. 3. While so held in proper angled relationship on the jig the outside mull casing or second cover strip 22 is nailed in position between each adjacent pair of frames, as shown in FIG. 3. The bow bay window assembly is then removed from the jig and the inside mull casing or first cover strip 23 is applied at the adjacent frames. As shown in FIG. 3, this cover strip 23 serves to conceal the connecting strips 14 and the fasteners or nails 18. After this has been done, the window assembly can then be installed and it is preferably after installation that the sash (not shown) which was removed at the beginning of the assembly be replaced in the frames.

A second embodiment of the invention is shown in FIGS. 7 and 8 in relation to an angle bay assembly. As is customary the angle bay 24 comprises a large central window section 25 with a pair of smaller window sections 26 on opposite sides. These may be interconnected by the same bendable strips 14 as used in the first embodiment and cover strips 27 and 28 are used in the same manner as the strips 22 and 23 of the first embodiment.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. A bay window structure having inner and outer sides, comprising: a plurality of window frames arranged with side-by-side adjacent edges on said inner side; a bendable unitary connecting strip attached to said frame edges adjacent to said inner side of said bay structure and bridging the space between said frame edges, said strip being bent to the contour of said bay structure; a first cover strip attached to said frames to conceal said connecting strip; and a second cover strip interconnecting said frames at the outer side of said bay structure, said connecting strip being rigid after bending and thereby retaining said window frames in said bay contour preparatory to the attaching of said cover strips.

2. The structure of claim 1 wherein said connecting strips are metal each continuous across said space and with an intermediate bend locating crease at said adjacent edges.

3. The structure of claim 1 wherein a plurality of said connecting strips are provided linearly aligned along each pair of said adjacent edges.

4. The structure of claim 1 wherein each said window frame is a part of a standard casement window unit with flat outer surfaces.

5. The structure of claim 1 wherein said connecting strips are metal each continuous across said space and with an intermediate bend locating crease at said adjacent edges, a plurality of said strips are provided linearly aligned along each pair of said adjacent edges, and each said window frame is a part of a standard casement window unit with flat outer surfaces.

References Cited
UNITED STATES PATENTS

| | | | |
|---|---|---|---|
| 460,478 | 9/1891 | Mesker et al. | 52—201 |
| 1,975,933 | 10/1934 | Franklin | 52—201X |
| 2,137,290 | 11/1938 | Huckstep et al. | 52—71 |
| 2,810,941 | 10/1957 | Mainieri | 52—201 |

ALFRED C. PERHAM, Primary Examiner

U.S. Cl. X.R.

52—714